(12) United States Patent
Rozmarynowski et al.

(10) Patent No.: US 10,118,242 B2
(45) Date of Patent: Nov. 6, 2018

(54) WELDING POWER SUPPLY WITH POWER TAKE-OFF SHAFT

(75) Inventors: Scott Ryan Rozmarynowski, Greenville, WI (US); David L. Knoll, De Pere, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1858 days.

(21) Appl. No.: 13/118,076

(22) Filed: May 27, 2011

(65) Prior Publication Data

US 2011/0309055 A1 Dec. 22, 2011

Related U.S. Application Data

(60) Provisional application No. 61/355,986, filed on Jun. 17, 2010.

(51) Int. Cl.
*B23K 9/32* (2006.01)
*B23K 9/10* (2006.01)
*F02B 63/04* (2006.01)
*H02K 7/00* (2006.01)

(52) U.S. Cl.
CPC .............. *B23K 9/1006* (2013.01); *B23K 9/32* (2013.01); *F02B 63/04* (2013.01); *H02K 7/00* (2013.01); *H02K 7/003* (2013.01); *Y10T 29/49002* (2015.01)

(58) Field of Classification Search
CPC ....... B23K 9/1006; B23K 9/32; B23K 9/1043
USPC ............... 219/54–60 A, 70, 78.01, 101–116, 219/130.1–133, 137
See application file for complete search history.

(56) References Cited

U.S. PATENT DOCUMENTS

| | | | |
|---|---|---|---|
| 2,463,907 A * | 3/1949 | Risley et al. | 228/5.1 |
| 5,907,970 A | 6/1999 | Havlovick et al. | |
| 7,105,774 B2 * | 9/2006 | Bender et al. | 219/133 |
| 2008/0202285 A1 | 8/2008 | Pedrazzini-Bertolazzi | |
| 2009/0218327 A1 | 9/2009 | Beeson | |
| 2010/0107624 A1 * | 5/2010 | Loeffler | 60/415 |
| 2011/0118076 A1 | 5/2011 | Lang | |

FOREIGN PATENT DOCUMENTS

JP 2009112923 A1 9/2009
JP 2010038006 A 2/2010

OTHER PUBLICATIONS

International Search Report for application No. PCT/US2011/040403 dated Oct. 19, 2011.

* cited by examiner

*Primary Examiner* — Tu B Hoang
*Assistant Examiner* — Thomas Ward
(74) *Attorney, Agent, or Firm* — McAndrews, Held & Malloy, Ltd.

(57) ABSTRACT

A welding power supply having a power take-off shaft is provided. The welding power supply has an engine having an output shaft coupled a generator, where the engine shaft drives the generator to produce an electric current. The engine shaft further extends through the generator and is coupled to the power take-off shaft. One of a plurality of auxiliary attachments may be attached to the power-take off shaft and may be driven by the power-take off shaft.

17 Claims, 3 Drawing Sheets

WELDING POWER SUPPLY WITH POWER TAKE-OFF SHAFT

CROSS REFERENCE TO RELATED APPLICATIONS

This application is a Non-Provisional patent application of U.S. Provisional Patent Application No. 61/355,986 entitled "Welder/Generator with PTO", filed Jun. 17, 2010, which is herein incorporated by reference.

BACKGROUND

The invention relates generally to welding systems, and, more particularly, to a welding power supply with a power take-off (PTO) shaft.

Welding is a process that has become increasingly ubiquitous in various industries and applications. Such welding operations may use a variety of energy sources to generate the heat needed to melt workpieces and adder metals to be welded. For example, welding operations may use an electric arc, a laser, a gas flame, an electron beam, and the like to bring the workpieces and adder metals to melting temperature. In arc welding operations a welding power supply is used to generate and/or provide electric current and voltage levels satisfactory for the welding process. The welding power supply may provide a constant current or a constant voltage to the welding application, depending on the arc welding process used, or various control regimes (e.g., pulsed regimes) may be used. For example, a shielded metal arc welding process may use a constant current welding power supply, while a gas metal arc welding or flux-cored arc welding process may use a constant voltage welding power supply. Moreover, different designs of welding power supplies are available, such as a power converter based systems and inverter based systems. Alternatively, the welding power supply may include an electrical generator configured to convert mechanical energy into electrical energy. Specifically, such generator welding supplies may include an engine, such as an internal combustion engine, configured to rotate a shaft to drive the generator.

Some welding power supplies are designed to provide auxiliary power for equipment such as lights, power tools, and the like. However, such machines may be more complex than needed for many applications, and often require special circuitry for conditioning the auxiliary power. There is a need for welding power supply designs that may allow for driving certain auxiliary equipment without relying on generation and conditioning of auxiliary power, and that may be adapted for at least some of the equipment that may be needed in many work settings.

BRIEF DESCRIPTION

In an exemplary embodiment, a welding power supply includes an engine having an output shaft, a generator coupled to the engine and driven by the output shaft to generate power for a welding application, and a power take-off shaft coupled to either the engine or the generator and driven by the output shaft. The power take-off shaft is configured to drive one of a plurality of auxiliary attachments.

In another exemplary embodiment, a welding power supply includes an engine having an engine shaft, a generator coupled to the engine shaft and driven by the engine shaft to produce power for a welding application, and a power take-off shaft coupled to the engine shaft and driven by the engine shaft to drive an auxiliary attachment. The welding power supply further includes a clutch coupled to the output shaft and the engine shaft and configured to engage and disengage the engine shaft with the power take-off shaft and transfer torque from the engine shaft to the power take-off shaft.

In a further embodiment, a method of manufacturing a welding power supply includes coupling an engine shaft of an engine to a generator, coupling a power take-off shaft configured to drive an auxiliary attachment to the engine shaft, and coupling a clutch configured to transfer torque to the engine shaft and the power take-off shaft.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, embodiments of a welding power supply having a PTO shaft configured to power an auxiliary attachment are disclosed. Specifically, the welding power supply includes an engine or motor with an output shaft that drives a generator of the welding power supply. The output shaft of the engine and/or the generator is further used as a PTO shaft. More particularly, a variety of auxiliary attachments or machines may be coupled to, and powered by, the PTO shaft of the welding power supply. Example auxiliary attachments may include an air compressor, wood chipper, trash pump, water pump, hydraulic pump, and so forth. Because the auxiliary attachments are powered by the PTO shaft of the welding power supply, each auxiliary attachment may not require a separate motor to power the auxiliary attachment. As a result, the costs and required maintenance of the various auxiliary attachments are reduced. Moreover, the auxiliary attachment may be coupled to the PTO shaft of the welding power supply by a coupling having a housing which encloses the power transfer connection between the PTO shaft and the auxiliary attachment, thereby shielding the power transfer connection from tools, debris, or other materials in the surrounding environment.

Figure 1:
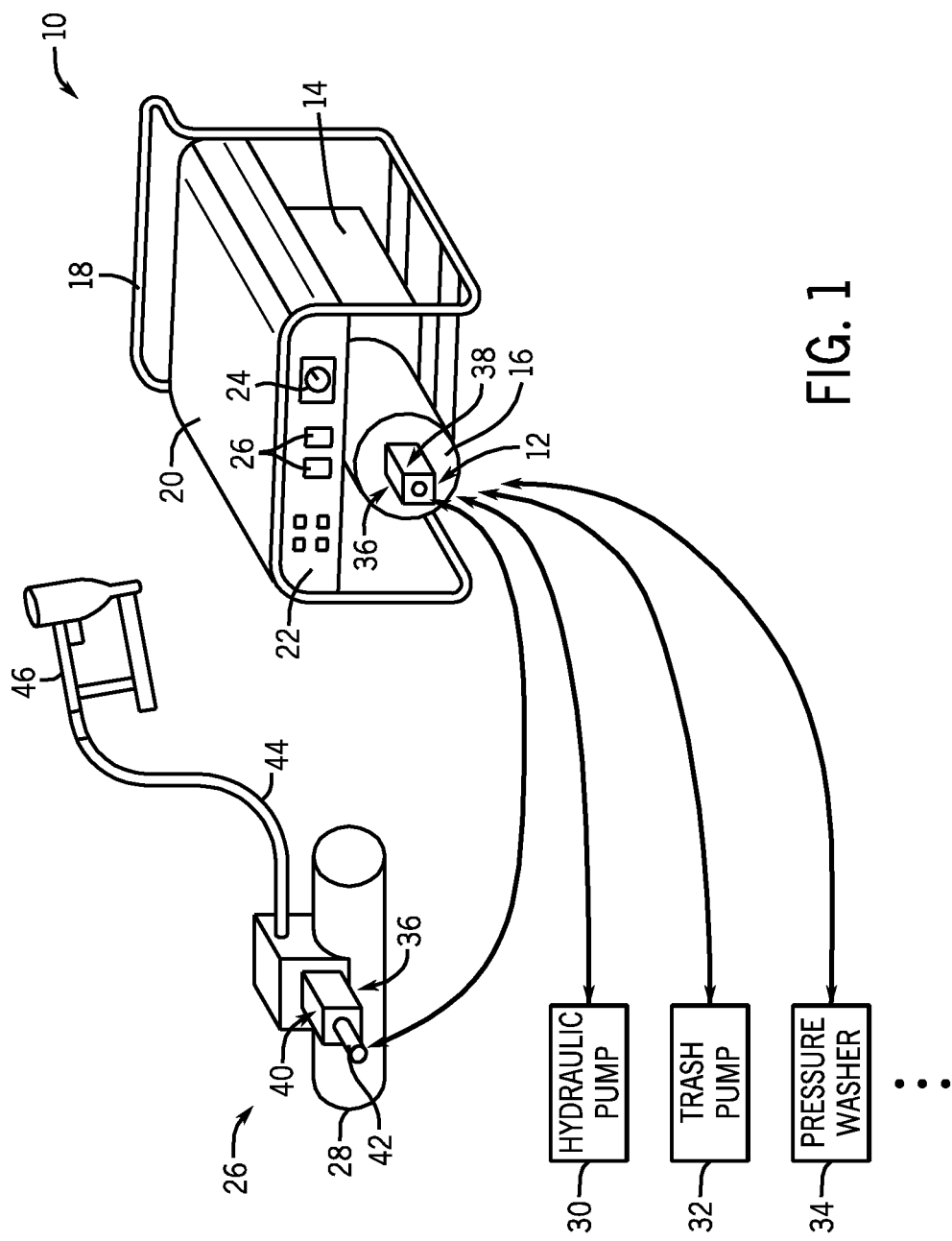
FIG. 1 is a perspective view of an exemplary welding power supply having an engine, a generator and a PTO shaft configured to power an auxiliary attachment.

Turning now to the drawings, FIG. 1 illustrates an exemplary welding power supply 10 having a PTO shaft 12. The welding power supply 10 includes an engine 14, such as an internal combustion engine, and a generator 16. As shown, the engine 14 is coupled to the generator 16. Specifically, as described in detail below, the engine 14 is configured to drive an output shaft in rotation. The output shaft of the engine 14 is coupled to the generator 16, thereby driving the generator 16 and producing an electric current for use in a welding application. The engine 14 and the generator 16 of the welding power supply 10 are supported by an external frame 18 of the welding power supply 10. The external frame 18 may be formed from metal tubular members, cross braces, and other metal components which are fused or bolted together. Additionally, in the illustrated embodiment, the external frame 18 is an external structure configured to support other components of the welding power supply 10. For example, in addition to the engine 14 and the generator 16, the external frame 18 supports a protective shell 20 and a user interface 22.

In the illustrated embodiment, the protective shell 20 extends at least partially over the top and lateral sides of the external frame 18. The protective shell 20 may be formed from sheet metal or plastic and is configured to protect the various components of the welding power supply from contact with dust, debris, and other environmental elements that could harm or damage the welding power supply 10. As mentioned above, the external frame 18 also supports the user interface 22. The user interface 22 may include various knobs, dials, buttons, and other controls for regulating the operation of the welding power supply 10. For example, the illustrated user interface 22 includes an amperage knob 24 configured to enable an operator to adjust the output of the electric current produced by the generator 16 of the welding power supply 10. The user interface 22 may also include voltage receptacles 26 configured to provide power for various jobsite tools. In certain embodiments, the user interface 22 may include a display configured to provide system feedback to a user. The display may also enable a user to input various system settings or parameters.

As mentioned above, the welding power supply 10 includes the PTO shaft 12 configured to drive an auxiliary attachment 26. As mentioned above, the auxiliary attachment 26 may be one of a variety of machines or components such as an air compressor 28, a hydraulic pump 30, a trash pump 32, a pressure washer 34, or another machine configured be powered by the PTO shaft 12. In the illustrated embodiment, the air compressor 28 is configured to be coupled to the PTO shaft 12 by a coupling 36. Specifically, the coupling 36 has a female end 38 disposed on the welding power supply 10 and coupled to the PTO shaft 12 (i.e., the output shaft of the engine 14) and a male end 40 disposed on the air compressor 28. In other embodiments, as described below, the male end 40 may not be disposed on the air compressor 28. For example, the male end 40 may extend from the air compressor 28 and may be coupled to the air compressor 28 by a flex shaft. Additionally, while the illustrated embodiment shows the female end 38 disposed on the welding power supply 10 and the male end 40 disposed on the air compressor 28, other embodiments may include the female end 38 disposed on the air compressor 28 and the male end 40 disposed on the welding power supply 10.

As shown, the male end 40 of the coupling includes a power transfer connector 42. The power transfer connector 42 may be a shaft, a flex shaft, a U-joint, or other connector configured to transfer power from the PTO shaft 12 to the air compressor 28, or other auxiliary attachment 26. As discussed in detail below, the coupling 36 may include a housing configured to enclose the connection between the PTO shaft 12 and the power transfer connector 42, thereby shielding the connection from tools, debris, or other materials in the surrounding environment.

In operation, the engine 14 of the welding power supply 10 drives the output shaft of the engine 14 in rotation, thereby driving the PTO shaft 12. The PTO shaft itself may be an extension of the motor shaft, or the generator shaft, or a separate shaft may be used (i.e., a jackshaft coupled to either of these). Furthermore, the PTO shaft 12 of the welding power supply 10 drives the auxiliary attachment 26 (e.g., the air compressor 28), which is coupled to the PTO shaft 12 by the power transfer connector 42 and the coupling 36. For example, in the illustrated embodiment, the PTO shaft 12 of the welding power supply 10 drives the air compressor 28, which may be used for a variety of applications. For example, the air compressor 28 may provide a supply of compressed air through a hose 44 to a pneumatic nail gun 46. In other embodiments, the air compressor 28 may provide compressed air to other pneumatic tools, gas cylinders, tires or other inflatables, and so forth.

Figure 2:
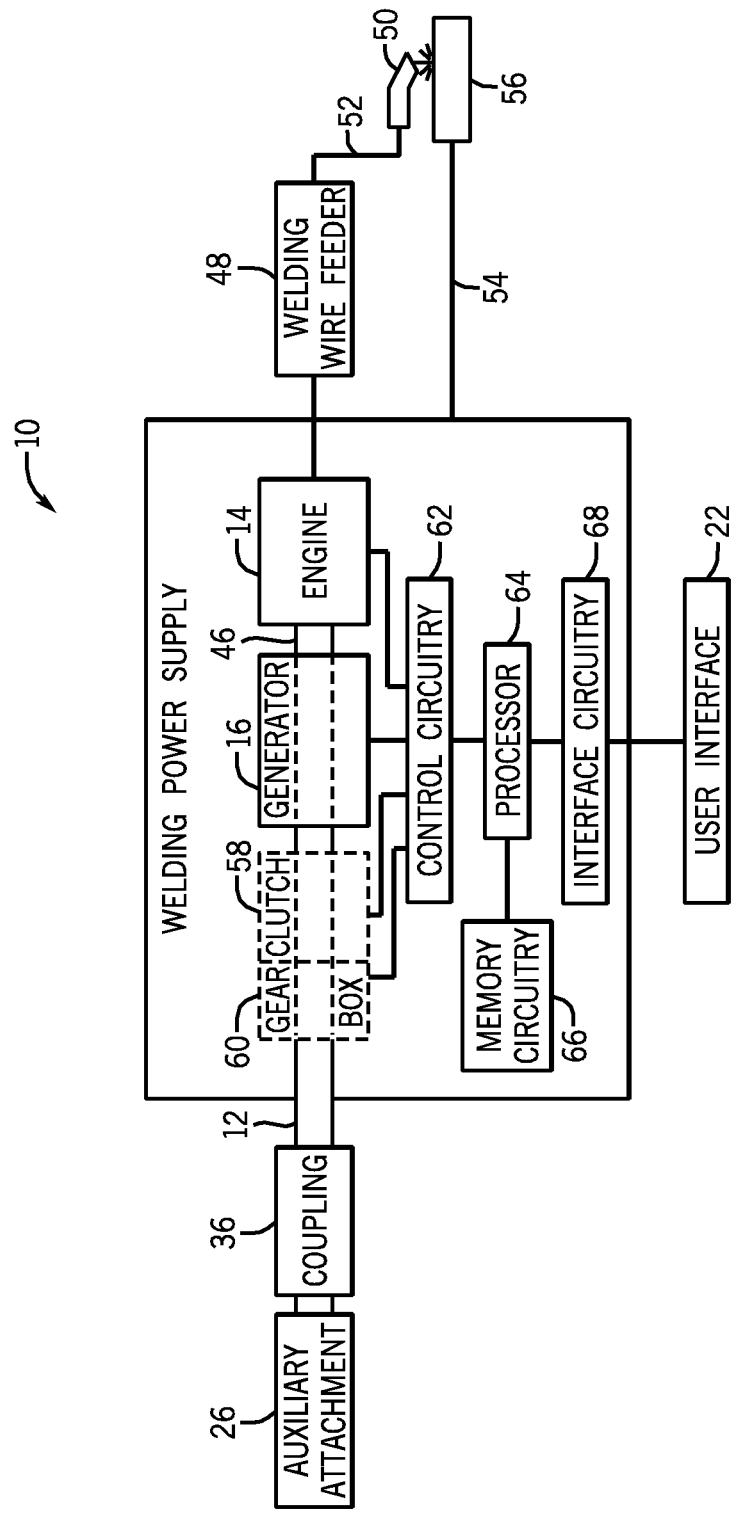
FIG. 2 is a block diagram illustrating exemplary functional components of the welding power supply of FIG. 1, in accordance with aspects of the present disclosure.

FIG. 2 is a block diagram illustrating certain of the internal components of the welding power supply 10. As discussed above, the welding power supply 10 includes an engine 14 configured to drive an output shaft 46, which is coupled to the generator 16 of the welding power supply 10. In operation, as the output shaft 46 drives the generator 16, the generator 16 produces an electric current for use in a welding operation. For example, the generator 16 may supply an electric current for a shielded metal arc welding (SMAW) or "stick" welding application. In other words, the welding power supply 10 may internally generate and provide welding power and/or auxiliary power for use in a welding application. For example, the welding power supply 10 may have a SMAW output that is internal to the welding power supply 10. Alternatively, in other embodiments, an auxiliary output of the welding power supply 10 may provide the electric current to a welding sire feeder 48, or other external machine such as a metal inert gas (MIG) machine or "stick" welding machine. In the illustrated embodiment, the welding wire feeder 48 is coupled to the welding power supply 10. The electric current is routed from the welding wire feeder 48 to a welding gun 50, along with a welding wire supplied by the welding wire feeder 48. As shown, the electric current and the welding wire are routed to the welding gun 50 through a first cable 52. A second cable 54 couples the welding power supply 10 to a work piece 56 (typically via a clamp) to complete the circuit between the welding power supply 10 and the welding gun 50 during a welding operation.

As mentioned above, embodiments of the welding power supply 10 may include a PTO shaft 12 configured to drive the auxiliary attachment 26. Specifically, the auxiliary attachment is coupled to the PTO shaft 12 by the coupling 36. As shown, the output shaft 46 of the engine 14 extends through the generator 16 to the PTO shaft 12. As the engine 14 rotates output shaft 46, the PTO shaft 12 is driven, thereby powering the auxiliary attachment 26 coupled to the PTO shaft 12. As will be appreciated, because the auxiliary attachment 26 is powered by the PTO shaft 12 of the welding power supply 10, the auxiliary attachment 26 may not require a separate engine, motor, or other power source.

In certain embodiments, the welding power supply 10 may include other components configured to regulate the operation of the PTO shaft 12, and thus, the auxiliary attachment 26. For example, the welding power supply 10 may include a clutch 58 configured to transmit power from the output shaft 46 of the engine 14 to the PTO shaft 12. More specifically, while the engine 14 is driving the output shaft 46, the clutch 58 may be engaged with the PTO shaft 12, thereby enabling the output shaft 46 to drive the PTO shaft 12. Alternatively, the clutch 58 may be disengaged with the PTO shaft 12. When the clutch 58 is disengaged from the PTO shaft 12, the engine 14 may drive the output shaft 46, thereby driving the generator 16, but the PTO shaft 12 is not driven by the output shaft 46. As will be appreciated, the clutch 58 may be disengaged when an auxiliary attachment 26 is not coupled to the PTO shaft 12. In certain embodiments, the clutch 58 may be a slipping clutch, thus enabling the output shaft 46 and the PTO shaft 12 to be engaged, but rotating at different speeds relative to one another.

The welding power supply 10 may further include a gear box 60 configured to transmit an adapted amount of power to the PTO shaft 12 from the output shaft 46 of the engine 14. In other words, the gear box 60 serves to change (e.g., reduce or increase) the speed and/or torque of the PTO shaft 12 relative to the output shaft 46 of the engine 14. In certain embodiments, the gear box 60 includes multiple gears which may be shifted as the desired speed of the PTO shaft 12 varies. For example, different PTO shaft 12 speeds may be required for different auxiliary attachments 26 (e.g., an air compressor, water pump, wood chipper, and so forth). Similarly, for a particular auxiliary attachment 26, the auxiliary attachment 26 may have multiple operating levels, thereby requiring a different PTO shaft 12 speed for each operating level. Furthermore, gears of the gear box 60 may be shifted as the speed of the output shaft 46 varies. More specifically, in a MIG welding application, the output shaft 46 of the engine 14 may vary depending on the operation of the welding wire feeder 48 and/or the welding gun 50. For example, when the welding gun 50 is being used for a MIG welding operation, the speed of the output shaft 46 of the engine 14 may increase. In other words, during the operation of the welding gun 50, the speed of the output shaft 46 increases, thereby increasing the output of the generator 16 to provide the required electric current to the welding gun 50 for the welding operation. Alternatively, when the welding gun 50 is not in use, the speed of the output shaft 46 may be lower because an electric current produced by the generator 16 may not be required. As a result, the gear box 60 may serve to maintain a constant speed of the PTO shaft 12 or adjust the speed of the PTO shaft 12 as the speed of the output shaft 46 of the engine 14 varies.

In the illustrated embodiment, the welding power supply 10 also includes control circuitry 62, a processor 64, memory circuitry 66, and interface circuitry 68. The control circuitry 62 is configured to apply control signals to various components of the welding power supply 10. In particular, the control circuitry 62 is configured to regulate the operation of the engine 14, the generator 16, the clutch 58, and the gear box 60. In certain embodiments, the control circuitry 62 may apply control signals to the engine 14 and/or the generator 16 to achieve a desired electric current output from the welding power supply 10. Additionally, the control circuitry 62 may provide control signals to the clutch 58 to engage or disengage the PTO shaft 12 with the output shaft 46 of the engine 14. Similarly, the control circuitry 62 may provide control signals to the gear box 60 to shift the gears of the gear box 60 based on the changes in the speed of the output shaft 46 and/or based on the desired speed of the PTO shaft 12.

The control circuitry 62 is further coupled to the processor 64, memory circuitry 66, and interface circuitry 68. The interface circuitry 68 is coupled to the user interface 22 of the welding power supply 10. As discussed above, the user interface 22 is configured to enable an operator to input and control various settings of the welding power supply 10. For example, the user interface 22 may include a menu or list for selecting a welding process, voltage output, or current output of the welding power supply 10. The user interface 22 may further be configured to enable a user to input and control various settings of the auxiliary attachment 26. For example, the user interface 22 may include a menu for selecting a particular auxiliary attachment 26 coupled to the PTO shaft 12. As will be appreciated, different welding processes may have different characteristics and may require differing configurations for various operating parameters. For example, configuration parameters requiring differing values may include voltage output, current output, and so forth. Similarly, different auxiliary attachments 26 may have different characteristics and may require different configurations for various operating parameters of the welding power supply 10, such as speed and torque of the PTO shaft 12. Preset values for such configuration parameters, as well as others, may be stored in the memory circuitry 58 for each of a variety of welding processes and auxiliary attachments 26.

By way of example, a user may select an auxiliary attachment 26 from a menu of a plurality of different auxiliary attachments 26 displayed on the user interface 22 of the welding power supply 10. In certain embodiments, the user interface 22 may also enable a user to input various characteristics, such as power usage, of the selected auxiliary attachment 26. The user interface 22 communicates the selection of the auxiliary attachment 26, and any inputted characteristics of the auxiliary attachment 26, to the interface circuitry 68, which communicates the selection to the processor 64. The processor 64 then retrieves the particular configuration parameters for the selected auxiliary attachment 26 stored in the memory circuitry 66. Thereafter, the processor 64 sends the configuration parameters to the control circuitry 62 in order that the control circuitry 62 may apply appropriate control signals to the engine 14, clutch 58, and/or gear box 60.

Figure 3:
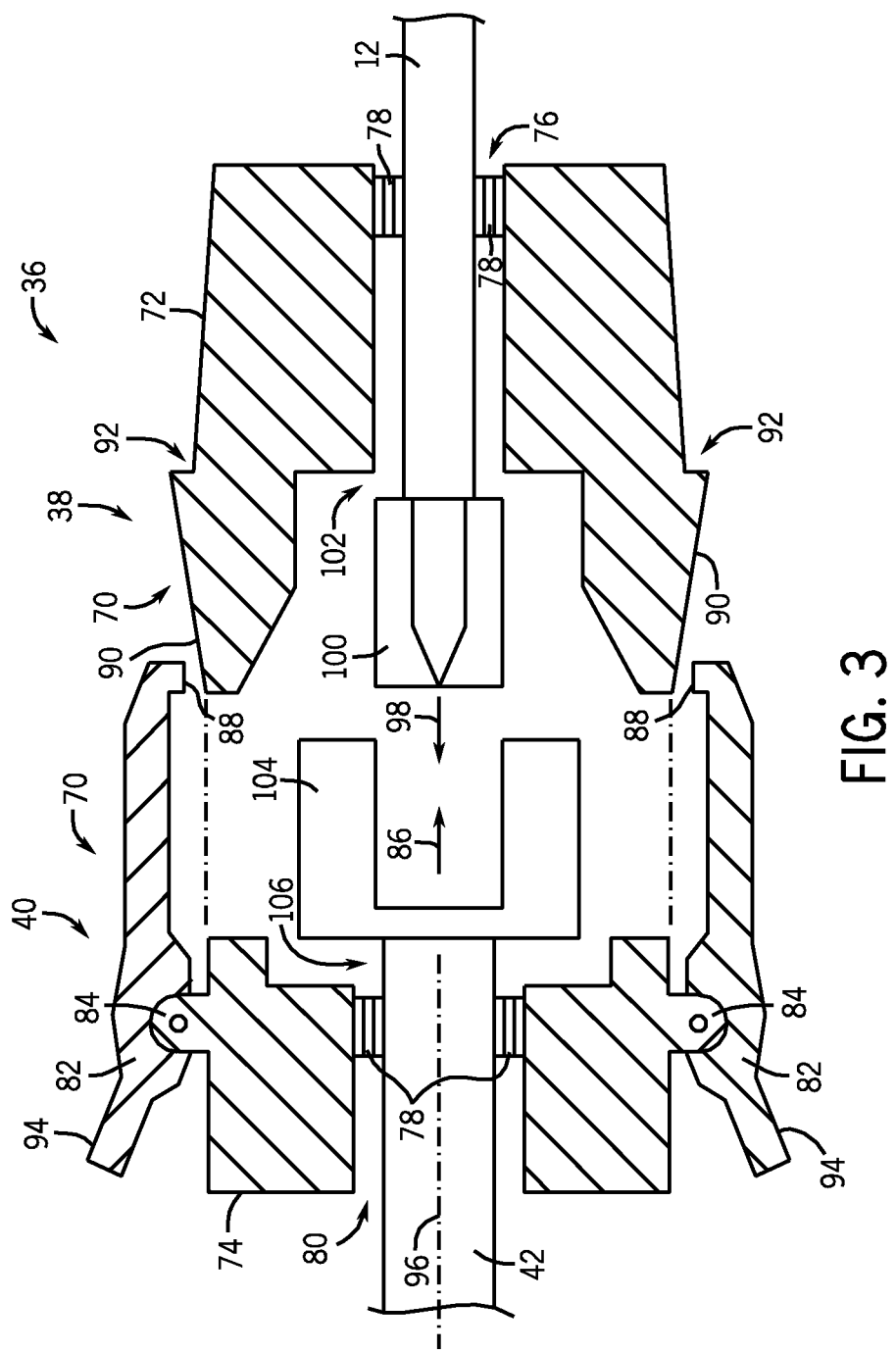
FIG. 3 is a cross-sectional side view of an exemplary coupling configured to couple the PTO shaft of the welding power supply of FIG. 1 to the auxiliary attachment.

FIG. 3 is a cross-sectional side view of the coupling 36 shown in FIG. 1, illustrating the female end 38 and the male end 40 of the coupling 36. In particular, the female end 38 of the coupling 38 includes the PTO shaft 12, and the male end 40 includes the power transfer connector 42, which may be a shaft, flex shaft, or U-joint. As mentioned above, the coupling 36 includes a housing 70 disposed about the PTO shaft 12 and the power transfer connector 42, thereby shielding the PTO shaft 12 and the power transfer connector 42 from the surrounding environment. Specifically, the housing 70 includes a female portion 72 and a male portion 74. In the illustrated embodiment, the PTO shaft 12 extends through an opening 76 of the female portion 72 of the housing 70, and is configured to engage with the power transfer connector 42. Bearings 78 are disposed between the opening 76 and the PTO shaft 12 to allow constrained rotation of the PTO shaft 12 within the female portion 72 of the housing 70.

Similar to the female portion 72 of the housing 70, the male portion 74 of the housing 74 has an opening 80 through which the power transfer connector 42 extends toward the PTO shaft 12. The opening 80 also includes bearings 78 disposed between the opening 80 and the power transfer connector 42 to allow constrained rotation of the power transfer connector 42 within the male portion 74 of the housing 70. The male portion 74 of the housing 70 further includes housing clips 82 which are coupled to mounts 84 of the male portion 74 by bolts, rods, or other fasteners. The housing clips 82 are configured to engage with the female portion 72 of the housing 70. Specifically, as the male portion 74 is translated in a direction 86 (i.e., in an axial direction toward the female portion 72 of the housing 70), a tooth portion 88 of each housing clip 82 contacts an outer surface 90 of the female portion 72 of the housing 70. As the male portion 74 is further translated in the direction 86, the tooth portion 88 of each housing clip 82 engages with a recess 92 of the outer surface 90 of the female portion 72 of the housing 70. As will be appreciated, when the tooth portion 88 of each housing clip 82 is engaged with the recess 92 of the outer surface 90 of the female portion 72, the female and male portions 72 and 74 of the housing 70 are interlocked, and the PTO shaft 12 and the power transfer connector 42 are connected such that power (i.e., torque) may be transferred from the PTO shaft 12 to the power transfer connector 42.

The female and male portions 72 and 74 of the housing 70 may be disengaged from one another by releasing the tooth portion 88 of each housing clip 82 from the recess 92 in the outer surface 90 of the female portion 72. Specifically, each housing clip 82 includes a lever 94 that, when depressed toward a central axis 96 of the male portion 74 of the housing 70, will cause the housing clip 82 to pivot about the mount 84 of the male portion 74 of the housing 70. As the housing clip 82 pivots about the mount 84, the tooth portion 88 of the housing clip 82 becomes disengaged from the recess 92 of the female portion 72 of the housing 70. With the tooth portion 88 disengaged from the recess 92, the male portion 74 may be removed from connection with the female portion 72 by translating the male portion 74 in a direction 98 (i.e., opposite the direction 86).

As mentioned above, when the female and male portions 72 and 74 of the housing 70 are engaged with one another, the PTO shaft 12 and the power transfer connector 42 are engaged, thereby enabling the PTO shaft 12 to rotate the power transfer connector 42. Specifically, the PTO shaft 12 includes a male connector 100 disposed on an end 102 of the PTO shaft 12, and the power transfer connector 42 includes a female connector 104 disposed on an end 106 of the power transfer connector 42. When the female and male portions 72 and 74 of the housing 70 are engaged, the male connector 100 of the PTO shaft 12 is received by the female connector 104 of the power transfer connector 42.

The male connector 100 and the female connector 106 may have a variety of different configurations to enable the PTO shaft 12 to transfer power (i.e., torque) to the power transfer connector 42. For example, the male connector 100 and the female connector 106 may have a splined configuration. Specifically, the male connector 100 may include one or more ridges or teeth (i.e., a male spline) that are configured to mesh with grooves (i.e., a female spline) formed in the female connector 106. In other embodiments, the male and female connectors 100 and 106 may have a Lovejoy connection. In embodiments of the male and female connectors 100 and 106 having a Lovejoy configuration, the male and female connectors 100 and 106 may engage with a coupling insert disposed between the male and female connectors 100 and 106. For further example, the male and female connectors 100 and 106 may have a keyed configuration. More specifically, the male connector 100 may include one or more keys configured to engage with one or more keyways or keyseats formed in the female connector 106.

As discussed above, embodiments of the present disclosure are directed towards a welding power supply 10 having a PTO shaft 12. The PTO shaft 12 utilizes power generated by the engine 14 of the welding power supply 10 to power any of a variety of auxiliary attachments 26, such as air compressors, hydraulic pumps, water pumps, wood chippers, and so forth. In particular, the output shaft 46 of the engine 14 is used to drive the PTO shaft 12 which is coupled to the auxiliary attachment 26. The PTO shaft 12 is coupled to the auxiliary attachment 26 by a coupling 36, which may include the housing 70 configured to shield the rotating PTO shaft 12 from debris and other materials in the surrounding environment. The PTO shaft 12 enables the welding power supply 10 to power jobsite tools or other machines in a welding environment.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding power supply, comprising:
   an engine having an output shaft;
   a generator coupled to the engine and driven by the output shaft to generate power for a welding application; and
   a power take-off shaft coupled to the generator on a side of the generator opposite the engine and driven by the output shaft, wherein the power take-off shaft is configured to drive one of a plurality of auxiliary attachments.

2. The welding power supply of claim 1, comprising a clutch configured to transfer torque from the output shaft to the power take-off shaft.

3. The welding power supply of claim 1, comprising a gear box configured to convert torque between the output shaft and the power-take off shaft.

4. The welding power supply of claim 1, comprising a coupling configured to engage the power take-off shaft with a power transfer connector of each of the plurality of auxiliary attachments, wherein the coupling comprises a housing configured to releasably secure the power take-off shaft to the power transfer connector of each of the plurality of auxiliary attachments.

5. The welding power supply of claim 1, comprising control circuitry configured to apply control signals to the engine to regulate rotational speed of the output shaft.

6. The welding power supply of claim 2, comprising control circuitry configured to apply control signals to the clutch based upon the attachment of each of the plurality of auxiliary attachments.

7. The welding power supply of claim 1, comprising control circuitry configured to allow for user selection of an auxiliary attachment from the plurality of auxiliary attachments.

8. The welding power supply of claim 7, comprising a user interface coupled to the control circuitry and configured to allow for user selection of an auxiliary attachment from the plurality of auxiliary attachments.

9. The welding power supply of claim 4, wherein the coupling comprises a male spline component coupled to the power take-off shaft and a female spline component coupled to the power transfer connector of each of the plurality of auxiliary attachments, wherein the male spline component and the female spline component are configured to engage with one another.

10. The welding power supply of claim 4, wherein the housing is configured to at least partially enclose the coupling when the power take-off shaft and the power transfer connector are engaged with one another.

11. A welding power supply, comprising:
    an engine having an engine shaft;
    a generator coupled to the engine shaft and driven by the engine shaft to produce power for a welding application;
    a power take-off shaft disposed on a side of the generator opposite the engine, wherein the power take-off shaft is coupled to the engine shaft and driven by the engine shaft to drive an auxiliary attachment; and a clutch coupled to the power take-off shaft and the engine shaft and configured to engage and disengage the engine shaft with the power take-off shaft and transfer torque from the engine shaft to the power take-off shaft.

12. The welding power supply of claim 11, comprising a gear box coupled to the power take-off shaft and configured to convert the torque transferred to the power take-off shaft from the engine shaft.

13. The welding power supply of claim 11, comprising control circuitry configured to apply control signals to the clutch based upon the attachment of the auxiliary attachment to the welding power supply.

14. The welding power supply of claim 13, comprising a user interface coupled to the control circuitry and configured to allow for user selection of the auxiliary attachment from a plurality of auxiliary attachments.

15. The welding power supply of claim 11, wherein the clutch comprises a slipping clutch configured allow the engine shaft and the power take-off shaft to rotate at different speeds relative to one another.

16. The welding power supply of claim 11, comprising a coupling configured to releasably secure the auxiliary attachment to the welding power supply and configured to engage the power take-off shaft with a power transfer connector of the auxiliary attachment.

17. The welding power supply of claim 16, wherein the coupling comprises a housing at least partially disposed about the power take-off shaft and the power transfer connector.

\* \* \* \* \*